Oct. 27, 1970 — G. D. WALLEY — 3,536,278
SPACE VEHICLE RADIATORS
Filed June 15, 1967 — 2 Sheets-Sheet 1
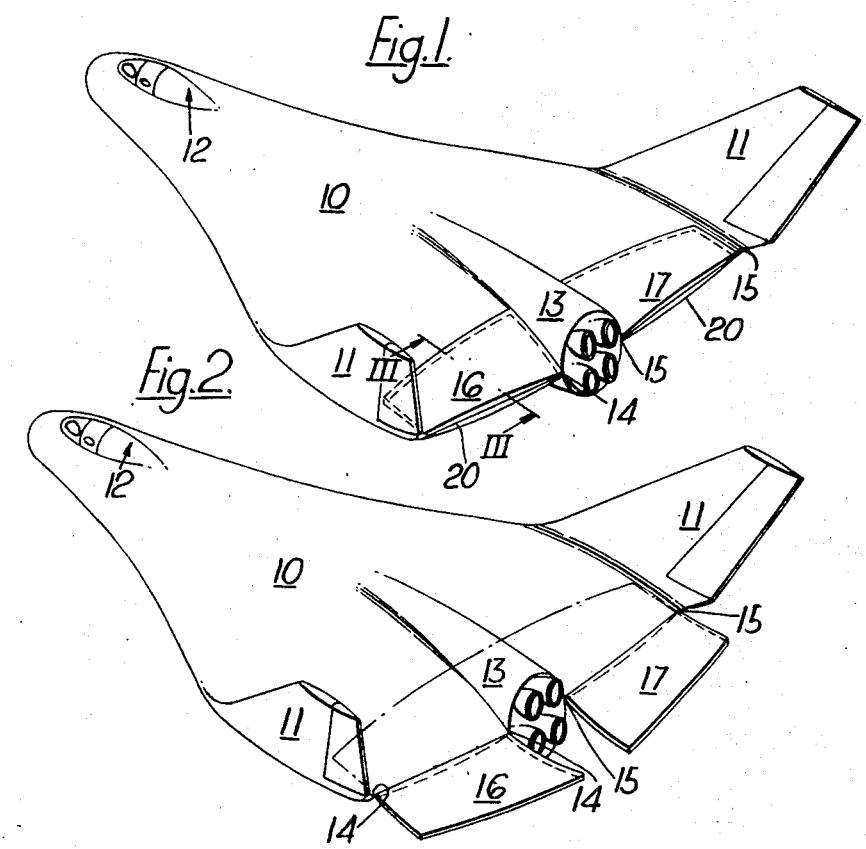
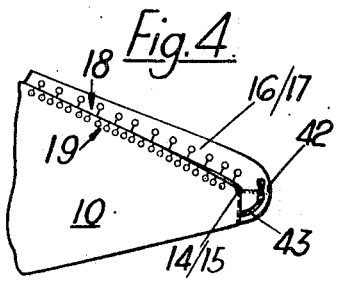
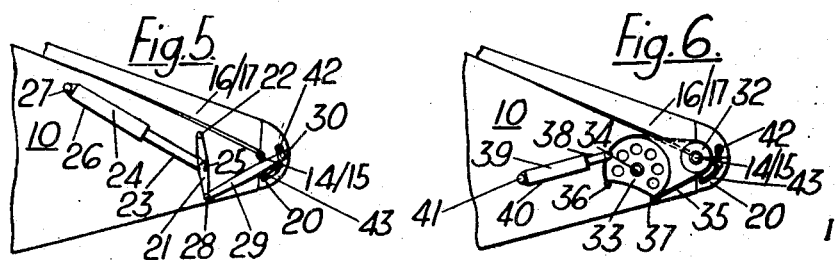
Inventor
GERALD DAVID WALLEY
By
Bailey, Stephens & Huettig Attorney

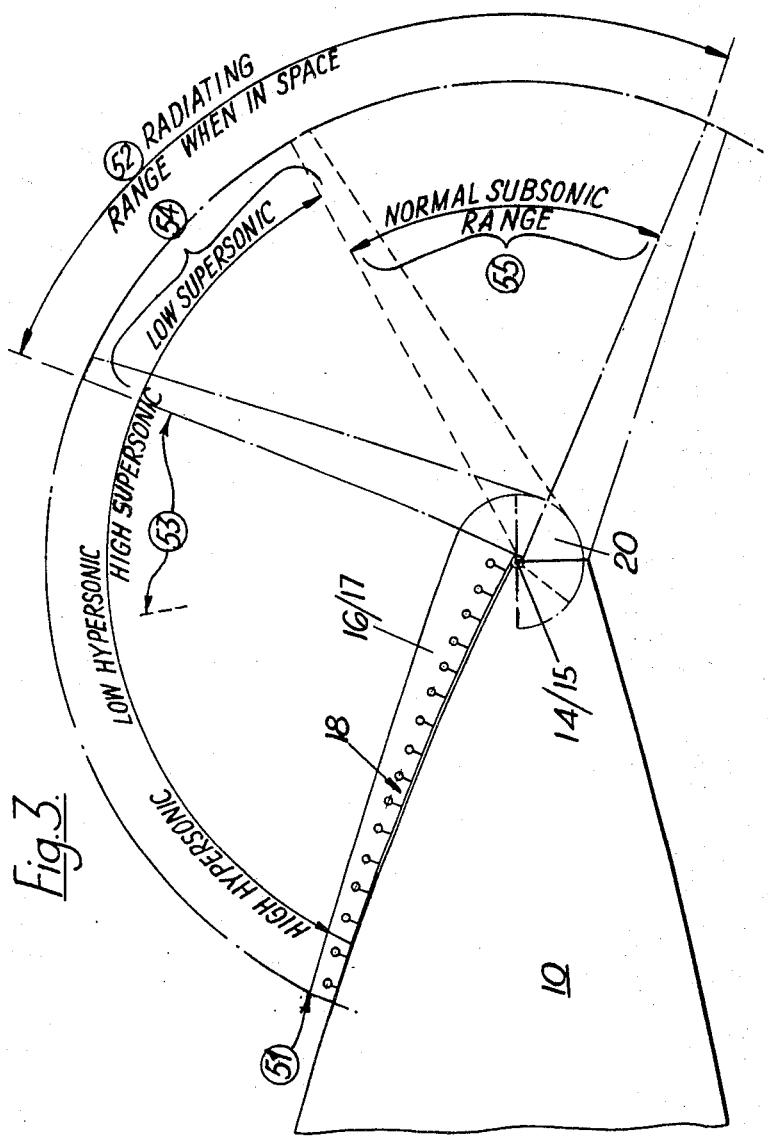

United States Patent Office 3,536,278
Patented Oct. 27, 1970

3,536,278
SPACE VEHICLE RADIATORS
Gerald David Walley, Long Ridge, near Preston, England, assignor to British Aircraft Corporation (Operating) Limited, London, England, a British company
Filed June 15, 1967, Ser. No. 646,328
Claims priority, application Great Britain, June 29, 1966, 29,144/66
Int. Cl. B64c
U.S. Cl. 244—1        7 Claims

ABSTRACT OF THE DISCLOSURE

A recoverable space vehicle is formed of a lifting body with a trailing edge on which are hinged two stabilizing and control flaps which are movable between a position closely adjacent to the body forward of the trailing edge and a position behind the trailing edge. Radiators for dissipating heat into dark space are mounted on the wall of the body which is covered by the flaps when they are in retracted position and on the inner faces of the flaps, so that these radiators are exposed only when the flaps are moved away from their retracted position.

---

This invention relates to recoverable space vehicles with a shape suitable to withstand the flight loads and temperatures encountered in the boost and also re-entry phases of space flight and capable of providing sufficient area-dynamic lift when in the earth's atmosphere to fly to a specified landing ground. Such a vehicle can be of the lifting body re-entry type and it is to this type that the invention more specifically relates.

In the majority of space vehicles, radiators are required to dissipate heat from the cabin and equipment cooling systems during space flight. Radiators of large area are necessary, and for maximum heat dissipation these must be oriented towards dark space, away from sun, moon and earth. This can be achieved by:

(a) Fixedly mounting the radiators on the spacecraft body and orientating the spacecraft, or (b) Where (a) is not desirable, the radiators can be movably mounted with respect to the spacecraft. In this case the radiators would need to extend from the spacecraft contour to be fully adjustable.

Each case poses difficulties in the recoverable type of vehicle because the radiators would require protection during the re-entry phase of flight. In the latter case the radiators would require to be retracted leading to mechanical complication and a considerable weight penalty.

With a recoverable spacecraft capable of generating aerodynamic lift when in the atmosphere, there are naturally considerable changes in longitudinal trim which occur during the various phases of flight approaching and within the earth's atmosphere, because of the wide speed and atmospheric density ranges which are encountered.

These aerodynamic problems necessitate large aerodynamic stabilising and control members which must be retracted or extended according to the flight conditions prevailing.

According to this invention a recoverable space vehicle includes at least one aerodynamic stabilising and control member capable of extension beyond and retraction substantially flush with the vehicle body, the vehicle having one or more heat radiators located such that on extension of the member the radiators are exposed and on retraction of the member the radiators are concealed.

Preferably the heat radiators are located on the stabilising and control member.

Additionally heat radiators are located on the body of the space vehicle.

The invention will be further described with respect to the accompanying drawing in which:

FIGS. 1 and 2 are perspective rear views of a lifting body recoverable space vehicle under different conditions, and FIGS. 3 to 6 are diagrammatic sections of the trailing edge of the vehicle and stabilising and control members taken about the line III—III of FIG. 1.

The space vehicle shown comprises a lifting body 10 with integral fins 11 and a crew compartment 12. Rocket motors 13 are provided at the rear of the vehicle. Pivotally attached to the trailing edge of the vehicle body along axes 14 and 15 are stabilising and control members 16 and 17. FIG. 1 illustrates these stabilising and control members retracted to lie external to, but substantially flush with, the vehicle body, while FIG. 2 illustrates the stabilising and control members extended.

FIGS. 3 and 4 illustrate the location of the radiators. In FIG. 3 radiators 18 are located on the inner surface of the stabilising and control members and in FIG. 4 further radiators 19 are located on the vehicle body immediately under the stabilising and control members when they are retracted.

Also illustrated is a fairing 20 which seals the gap between each stabilising and control member 16, 17 and the vehicle trailing edge when the stabilising and control members are retracted. Each fairing 20 is pivoted about axes 14 and 15 and is so dimensioned as to slide over the adjacent parts of the respective stabilising and control members 16 and 17, and within the adjacent portion of the trailing edge of the vehicle body, when the stabilising and control members are moved. Each fairing 20 is, in this example, connected to its respective stabilising and control members by links 42 (see FIG. 4), each link having one end pivoted to the stabilising and control member and the other end engaged in an arcuate slot 43 in the fairing.

On extension of the stabilising and control members 16 and 17, the link 42 slides until the end of the slot 43 is engaged, whereupon the fairing 20 is urged within the trailing edge of the vehicle, moving with the stabilising and control member. On retraction of the stabilising and control members 16 and 17, the link 42 slides until the other end of the slot 43 is reached whereupon the fairing 20 is withdrawn.

FIGS. 5 and 6 show alternative methods of actuating the stabilising and control members. Referring firstly to FIG. 5, a link 21 is pivoted to the vehicle structure at 22. The ram 23 of a jack 24 is pivoted to an intermediate point 25 on this link, the housing 26 of the jack being pivoted to the vehicle structure at 27. The further end of the link 21 is connected to one end 28 of a link 29 which is connected at its other end 30 to a point on the stabilising and control member.

Contraction of the jack 24 swings the link 21 in a clockwise arc (when viewed as in FIG. 5) thereby moving the link 29 so as to extend the stabilising and control member. By intermediate movements of the jack 24 the stabilising and control member can be made to assume various intermediate positions and can perform transient control movements.

FIG. 6 illustrates an alternative actuation system. It consists of a pulley or sprocket wheel 32 attached to a stabilising and control member concentrically with its pivot axes 14 and 15. A quadrant 33 is rotatably attached to the vehicle structure at 34. The wheel 32 and the quadrant 33 are connected by a cable or chain 35, the ends 36 and 37 of which are attached to the quadrant 33, whilst the housing 40 of the jack is connected to the vehicle structure at 41. In this embodiment extension of the jack 39 causes extension of the stabilising and control member.

FIG. 3 illustrates the range of operating positions of the stabilising and control members.

During the boost stage of flight, which is the acceleration period when the vehicle is being launched into space, the stabilising and control members 16 and 17 are retracted, control being effected by "puffer" jets of known design or by swivelling rocket motor nozzles. In this position of the stabilising and control members, the comparatively delicate radiators 18 and 19 are protected from kinetic heating and from acoustic and aerodynamic buffeting caused by hot exhaust gases from the motors. This position is illustrated in FIG. 1 and in position 51 of FIG. 3.

When in space, the stabilising and control members 16 and 17, being purely aerodynamic, are ineffective and can be extended to uncover the radiators 18 and 19. Normal pivotal movement of the stabilising and control members is within the range illustrated in FIG. 3, reference 52, and allows the radiators 18 to be oriented towards "dark" space for maximum heat dissipation. FIG. 2 also illustrates an extended position.

The space vehicle initially re-enters the atmosphere at about 40° of incidence at hypersonic speeds (above Mach 5). In this condition the stabilising and control members 16 and 17 must be retracted for aerodynamic reasons (reference 51). This also reduces the kinetic heating problems encountered on both the stabilising and control members and the radiating surfaces.

As the vehicle slows to low hypersonic/high supersonic speeds (say Mach 3), the stabilising and control members 16 and 17 are extended to the range of positions shown at 53 in FIG. 3.

The vehicle slows still further so that the heating decreases and it is also aerodynamically possible, and indeed necessary, to extend the stabilising and control members 16 and 17 still further until the angle of incidence of the vehicle is reduced and satisfactory trim is established. This occurs when the vehicle is at low supersonic speeds and in this condition the control members are within the range indicated at 54 in FIG. 3.

Eventually the vehicle slows to subsonic speeds where the stabilising and control members 16 and 17 are extended more or less horizontally. The range of movement in this condition is shown by reference 55. Throughout the latter re-entry stages, the stabilising and control members 16 and 17 are capable of movements both together and in opposing senses to provide longitudinal and lateral control of the vehicle.

This invention obviates the extra mechanical complexity and weight penalty incurred by having adjustable and retractable radiators by incorporating these in the surfaces of the stabilising and control members and/or in the areas of the body of the space vehicle, over which the stabilising and control members retract in certain flight conditions.

I claim:

1. A recoverable space vehicle including a lifting body with a trailing edge, at least one aerodynamic stabilizing and control member having a hinged edge and a free edge, hinge means connecting the hinged edge of the member to the trailing edge of the vehicle, means for swinging the member about said hinge means between a position in which the member lies substantially flush against the vehicle body with said free edge closely adjacent the body forward of the trailing edge and an extended position in which said free edge is remote from the body, heat radiator means for dissipating heat into dark space, and means mounting the heat radiator means in a location on the vehicle such that when the member is swung so that the said free edge is remote from the body, the radiator means is exposed.

2. A recoverable space vehicle according to claim 1 having a longitudinal axis and provided with two stabilizing and control members disposed symmetrically about the said longitudinal axis.

3. A recoverable space vehicle according to claim 1, having fairings connected by pivot means to said vehicle body and movable with and with respect to said stabilising and control members.

4. A recoverable space vehicle according to claim 1, in which said heat radiator means is located on said stabilizing and control member.

5. A recoverable space vehicle according to claim 1, in which said heat radiator means is located on said vehicle body.

6. A recoverable space vehicle according to claim 1, in which said heat radiator means comprises at least one heat radiator located on said stabilizing and control member and at least one heat radiator located on said vehicle body.

7. A recoverable space vehicle according to claim 1, in which said aerodynamic stabilising and control member is arranged to:

(1) lie substantially flush with said vehicle body during boosted and hypersonic re-entry flight,
(2) partially extend for stabilising and control purposes during low hypersonic and high supersonic flight,
(3) fully extend for stabilising and control purposes during low supersonic and subsonic flight and for heat radiation purposes in space flight.

References Cited

UNITED STATES PATENTS

| | | | |
|---|---|---|---|
| 2,164,545 | 7/1939 | Rogers | 244—57 |
| 2,249,948 | 7/1941 | Dornier | 244—57 |
| 2,291,607 | 8/1942 | Chausson | 244—57 X |
| 2,365,223 | 12/1944 | Silverstein et al. | 244—57 X |
| 2,504,137 | 4/1950 | Lewis | 244—57 X |
| 2,801,829 | 8/1957 | Taylor | 244—117 X |

FOREIGN PATENTS

| | | |
|---|---|---|
| 368,743 | 3/1939 | Italy. |
| 724,235 | 8/1942 | Germany. |

OTHER REFERENCES

"Aerodynamic Comparison of the Me 109 F and E," Aircraft Engineering, March 1942, page 74.

MILTON BUCHLER, Primary Examiner

J. L. FORMAN, Assistant Examiner

U.S. Cl. X.R.

244—42, 57, 90